(12) United States Patent
Xiao et al.

(10) Patent No.: US 12,113,699 B2
(45) Date of Patent: Oct. 8, 2024

(54) NETWORK TRANSMISSION OPTIMIZATION DEVICE FOR GRAPH-TYPE BLOCKCHAIN AND METHOD THEREOF

(71) Applicant: Huazhong University of Science and Technology, Wuhan (CN)

(72) Inventors: Jiang Xiao, Wuhan (CN); Bingru Si, Wuhan (CN); Jiajie Zeng, Wuhan (CN); Shijie Zhang, Wuhan (CN); Hanhua Chen, Wuhan (CN); Hai Jin, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 340 days.

(21) Appl. No.: 17/806,646

(22) Filed: Jun. 13, 2022

(65) Prior Publication Data
US 2023/0130074 A1    Apr. 27, 2023

(51) Int. Cl.
*H04L 45/12*    (2022.01)
*G06F 16/27*    (2019.01)
*H04L 45/00*    (2022.01)

(52) U.S. Cl.
CPC .............. *H04L 45/12* (2013.01); *G06F 16/27* (2019.01); *H04L 45/46* (2013.01)

(58) Field of Classification Search
CPC ....... H04L 45/12; H04L 45/46; H04L 12/185; H04L 9/3239; H04L 9/3247; H04L 67/10; H04L 69/04; G06F 16/27
See application file for complete search history.

(56) References Cited

U.S. PATENT DOCUMENTS

| | | | |
|---|---|---|---|
| 2020/0210451 A1* | 7/2020 | Wang | G06Q 20/02 |
| 2020/0311675 A1* | 10/2020 | Sankaran | G06Q 10/08345 |
| 2020/0374340 A1* | 11/2020 | Novotny | H04L 67/1042 |

(Continued)

FOREIGN PATENT DOCUMENTS

| | | |
|---|---|---|
| CN | 110198223 | 9/2019 |
| CN | 111695885 A | 9/2020 |

(Continued)

*Primary Examiner* — Abdullahi Ahmed
(74) *Attorney, Agent, or Firm* — Michael Ye; Kalos Athena Wang PLLC

(57) ABSTRACT

The present invention relates to a network transmission optimization device for a graph-type blockchain, at least comprising a transaction processing module, a node managing module, and a route managing module, wherein the transaction processing module performs compression on a transaction, and transaction data obtained through the compression are transmitted among different clusters through a routing node selected by the route managing module from at least one cluster, wherein the at least one cluster is obtained through dividing plural nodes by the node managing module. The network transmission optimization method provides a transaction coding scheme to the existing graph-type blockchain systems, and improve use efficiency of network bandwidth by means of parallelized broadcast. The structured network topology of the network transmission optimization method is made to address delay among nodes, and is adaptive to dynamic joining and exit of nodes, thereby improving network transmission efficiency.

16 Claims, 3 Drawing Sheets

(56) References Cited

U.S. PATENT DOCUMENTS

2020/0374343 A1* 11/2020 Novotny .............. G06F 16/9024
2020/0380825 A1* 12/2020 Purohit ................... G06F 16/27
2020/0394183 A1* 12/2020 Jois ..................... G06F 16/9024
2023/0069676 A1*  3/2023 Song ........................ H04L 9/50

FOREIGN PATENT DOCUMENTS

CN        111901350  A    11/2020
CN        113973021  B     1/2022

* cited by examiner

NETWORK TRANSMISSION OPTIMIZATION DEVICE FOR GRAPH-TYPE BLOCKCHAIN AND METHOD THEREOF

This application claims the benefit of the Chinese Patent Application No. 202110794130.7 filed on Jul. 13, 2021 and Chinese Patent Application No. 202111190084.6 filed on Oct. 12, 2021, which is hereby incorporated by reference as if fully set forth herein.

BACKGROUND OF THE INVENTION

1. Technical Field

The present invention relates to the technical field of network transmission protocols in blockchain systems, and more particularly to a network transmission optimization device for a graph-type blockchain and a method thereof.

2. Description of Related Art

A blockchain is a distributed system constructed from various technologies such as the encryption mechanism, the storage mechanism, the consensus mechanism, etc. It enables point-to-point transaction with mutual trust without using a central server. In a blockchain system, blocks are connected through their headers, so as to form a chain-like data storage structure. However, the chain-like structure brings about defects to a blockchain, such as low throughput, slow processing, long waiting, high energy consumption, and security concerns, which seriously limit applications of this technology.

With the progress of the blockchain technology, various blockchain-based platforms have been introduced, which require higher performance of blockchain systems and pose new requirements to the structure of blockchains. For making a blockchain system secure, reliable, and efficient, graph-type blockchains based on the DAG technology have been developed as a solution to solve multifarious problems in a public chain. To a chain-type network, the problem is not the inferior processing capacity of nodes, but the incapability for parallel computation of the chain-like structure, which is responsible for low throughput and long waiting time. For example, after a transaction is started, all nodes have to be synchronized with this transaction, and when one node confirms, the whole network has to be synchronized. To a DAG, this is not a problem because a DAG uses asynchronous accounting instead of synchronous accounting, and solves the problem of the traditional blockchain about high concurrency be means of parallelism. A transaction can be confirmed by simply undergoing local verification, global broadcast, and other local verifications. Every node stitches its own transactions with those confirmed by others. The transformation from a chain-like network to a graph-type network is a revolution to blockchains in terms from capacity to speed.

A blockchain network mainly serves to implement information interaction among nodes, and includes the network construction mechanism, the data dissemination mechanism, the data verification mechanism, etc. of the blockchain. How these mechanisms are designed can directly determine how fast information can be confirmed, thereby determining performance of the entire system. Currently, major applications using the DAG technology are usually constructed by means of Gossip broadcast and a random network topology. In such a random network topology (non-structured network topology), a new node randomly picks one node in the network to establish a connection channel, which cannot guarantee the system performance. In Gossip broadcast mode, a node randomly picks a neighboring node to send messages, thereby generating a huge amount of redundant data, and leading to low usage of the network bandwidth.

Moreover, the known network topology used in mainstream DAG projects fails to give proper consideration to physical network delay among nodes, thereby generating many high-delay connections, and this significantly degrades transmission efficiency of the network, leading to extremely low network throughput. Additionally, since a high-throughput blockchain system requires a great network bandwidth to disseminate transactions, the DAG technology is particularly advantageous in terms of concurrency. On the other hand, the traditional broadcast-based approach can not only generate considerable data redundancy and prevent high-efficiency use of bandwidth resources in the network, but also tends to cause network congestion and decrease system throughput. For example, in the prior art, China Patent Application Publication No. CN110198233A discloses a blockchain consensus method based on a trusted execution environment and a directed acyclic graph, as well as its system. The known method comprises: receiving event sets transmitted by neighboring nodes, determining whether events are valid based on trusted execution environment information carried by new events, then adding the valid event sets into the directed acyclic graph of the present node, if an event have been agreed by at least a predetermined number of nodes in the blockchain system, determining that consensus has been reached about the event, and ending this session of consensus; packing transactions generated by all nodes to a newly generated event, randomly picking one neighboring node, and transmitting the event sets that are known to the present node but unknown to the neighboring node to the neighboring node by means of a gossip message.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

In view of the problems of poor network transmission efficiency and low system throughput seen in network transmission of the prior-art graph-type blockchain applications caused by high-delay connections and high data redundancy, the present invention provides a network transmission optimization device for a graph-type blockchain and its method with the aim to reduce network delay and improve bandwidth usage in a graph-type blockchain network. The present invention provides a network transmission optimization device for a graph-type blockchain, at least comprising a transaction processing module, a node managing module, and a route managing module, wherein the transaction processing module performs compression on a transaction, and transaction data obtained through the compression are transmitted among different clusters through a routing node selected by the route managing module from at least one cluster, wherein the at least one cluster is obtained through dividing plural nodes by the node managing module. The operation of performing compression on the transactions may mean assigning a serial number to each transaction and compressing the referenced fields in the new transaction.

According to a preferred embodiment, the network transmission optimization device further comprises broadcast modules provided in each said node, wherein the broadcast modules use Gossip protocol to implement information broadcast inside the clusters and among the clusters.

According to a preferred embodiment, the transaction processing module performs compression on the transaction at least through compressing a first hash pointer of the transaction into a second hash pointer.

According to a preferred embodiment, the transaction processing module further encodes the transaction based on a standard-conforming encoding format, so as to realize a compressed representation of the transaction.

According to a preferred embodiment, the second hash pointer comprises a transaction height and a transaction index that take equal occupancy spaces in the second hash pointer.

According to a preferred embodiment, the transaction height may be the serial number of the transaction in the DAG graph.

The present invention further provides a network transmission optimization method for a graph-type blockchain, at least comprising: performing compression on a transaction, and transmitting transaction data obtained through the compression among different clusters through a routing node selected from at least one cluster, wherein the at least one cluster is obtained through dividing plural nodes. The operation of "performing compression on a transaction" may be achieved by: replacing a first hash pointer of a transaction entry with a second hash pointer of the transaction entry, and encoding the transaction with a standard-conforming coding format, so as to compress the size of the transaction and obtain a transaction coding sequence. A node carries out a matching and stores the transaction information after receiving the transaction coding sequence. The "at least one cluster" may be obtained by dividing all nodes in the network by means of secondary clustering. The "routing node" is selected from the nodes included in each cluster, for enabling different clusters to communicate with each other through the routing node.

The method comprises replacing a first hash pointer of a transaction entry with a second hash pointer of the transaction entry, and encoding the transaction with a standard-conforming coding format, compress the size of the transaction and obtain a transaction coding sequence. The method comprises: a node performing a matching to the transaction coding sequence in the buffer pool after receiving the transaction coding sequence, and attach it to the local book. The method comprises performing secondary clustering on all nodes of the network so as to divide them and obtain at least one cluster. The method comprises selecting a routing node in each cluster, for enabling different clusters to communicate with each other through the routing nodes.

According to a preferred embodiment, a Gossip protocol is used to implement intra-cluster and inter-cluster information broadcast.

According to a preferred embodiment, the step of performing compression on a transaction at least includes: compressing a first hash pointer of the transaction into a second hash pointer.

According to a preferred embodiment, the step of performing compression on a transaction further includes: encoding the transaction based on a standard-conforming encoding format, so as to realize a compressed representation of the transaction.

According to a preferred embodiment, the second hash pointer comprises: a transaction height, representing the serial number of a transaction in the DAG graph; and a transaction index, representing the encoded sequence obtained by compressing the transaction under the same transaction height, and the encoded sequence can uniquely specify that transaction. If the second hash pointer of a transaction is t_X, then t denotes the transaction height and X denotes the transaction index.

According to a preferred embodiment, the transaction height takes a space of 20 bits, sufficient to accommodate a certain DAG blockchain book containing $N \times 10^6$ transactions, wherein N is the number of network nodes. The transaction height of the genesis transaction is 0 and the transaction index takes a space of 20 bits, sufficient to record the compressed encoding of the transaction, so the second hash pointer takes a space of 40 bits.

According to a preferred embodiment, the operation of performing encoding on the transaction may be performing entropy coding on at least some fields in the transaction.

For addressing the problem of a high-throughput blockchain system about network congestion during broadcasting due to excessive data transmission in the network at the same time, the present invention provides a solution to compress existing local transactions in the DAG blockchain, which further compresses the 32-byte TXID (the SHA256 value of a transaction TX) according to certain manner, so as to allow each transaction to be represented by an even shorter transaction coding sequence. This will optimize the reference fields of new transactions as they are generated, and reduces the bandwidth consumed by new transactions when they are transmitted in the network, thereby realizing parallel broadcast of as many transactions as possible in the network without causing network congestion, and in turn improving the overall throughput of the system. After a node receives a new transaction, it matches the data of the reference fields in the transaction with the local buffer pool, and adds the new transaction to the local book. The more parallel transactions there are, the better the technical solution provides, under the condition that the limited network resources are not exceeded.

According to a preferred embodiment, the step of performing secondary clustering on all nodes in the network at least comprises: performing primary clustering on all nodes in the network, so as to divide them and obtain at least one primary cluster; and performing secondary clustering on the nodes in each primary cluster, so as to divide them and obtain at least one secondary cluster under the primary cluster.

According to a preferred embodiment, the step of clustering and dividing all nodes in the network is performed based on the number of neighboring nodes and node distances.

According to a preferred embodiment, each secondary cluster selects one node therein as a secondary routing node, which servers to forward the broadcast information transmitted by other secondary clusters to its own secondary cluster.

According to a preferred embodiment, each primary cluster selects a routing node of one secondary cluster therein as a primary routing node.

According to a preferred embodiment, the secondary routing node receives the broadcast information, and then forwards the broadcast information to other secondary routing nodes, which in turn forward the broadcast information to the nodes in their own secondary clusters, respectively, and/or the primary routing node receives the broadcast information, and then forwards the broadcast information to other primary routing nodes, which in turn forward the broadcast information to other secondary routing nodes in their own primary clusters, respectively.

For addressing high delay of transaction dissemination in a network, the present invention employs a clustering algorithm for clustering nearby nodes. First, every node in the network is assigned with a set of location coordinates, and network delay between nodes is represented by a node distance. This provides a theoretical basis to the design of the clustering algorithm. Then the clustering algorithm is used to cluster nodes in the network, so that network delay among nodes in a cluster can be limited to a relatively low range, thereby realizing low-delay dissemination among nodes in a cluster. On the basis of clustering, the resulting cluster undergoes internal secondary clustering. This is for further parallelization so as to reduce delay. Every secondary cluster selects a core node as its routing node, serving to forward data among the secondary clusters. Every primary cluster selects one secondary cluster, whose routing node is responsible for both data forwarding among the secondary clusters and data forwarding among the primary clusters.

According to a preferred embodiment, the Gossip protocol applies to both intra- and inter-cluster information broadcasting. For enhancing broadcast efficiency, the present invention adopts the Gossip protocol inside and among the clusters. According to the method of secondary clustering as disclosed in the present invention, numbers of the nodes in a secondary cluster, the secondary clusters, and the primary clusters are all relatively small, so the Gossip protocol does not have to cover a huge network. This effectively improves broadcast efficiency.

The technical schemes provided by the present invention have at least one of the following beneficial effects:

(1) The present invention provides a transaction coding scheme to the existing graph-type blockchain systems, and improves use efficiency of network bandwidth by means of parallelized broadcast, without causing network congestion.

(2) The present invention encodes transaction in a way that transactions and transaction coding sequences correspond to each other in a one-to-one manner, which fully considers the security of compression, thereby not only avoiding duality, but also helping reduce bandwidth consumption during transmission of transactions.

(3) The structured network topology of the present invention is made to address delay among nodes, and is adaptive to dynamic increase and decrease of nodes, thereby providing good scalability, robustness, even distribution among nodes, and self-organizing ability, leading to improved network transmission efficiency.

(4) In the present invention, transmission of transactions is designed with proper consideration of data redundancy. With dedicated inter- and intra-cluster broadcast approaches, message redundancy and network consumption can be effectively reduced, thereby realizing highly efficient parallel broadcast.

DETAILED DESCRIPTION OF THE INVENTION

Figure 1:
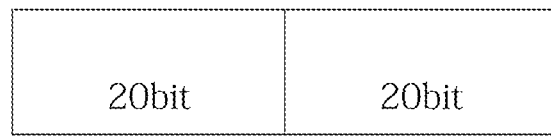
FIG. 1 is a simplified drawing illustrating a scheme for compressed representation of transactions of the present invention.

To make more lucid and clear the contents of the present invention, the present invention will be comprehensively described below with reference to the accompanying drawings in some embodiments. Apparently, the embodiments as described are merely partial, rather than the entire, embodiments of the present invention. Any other embodiments makeable by persons ordinarily skilled in the art on the basis of the embodiments in the present invention without creative effort shall all fall within the protection scope of the present invention.

For ease of understanding, technical terms of the present invention are explained as follows.

Mathematically, a DAG, or a directed acyclic graph, is a directed, finite graph with no directed cycles. It is composed of finite numbers of vertices and directed edges. Every directed edge is pointed from one vertex to another vertex. In a DAG, a trip started at any vertex will never come back to the origin vertex through these directed edges. In applications of blockchains, each vertex in a DAG graph represents a newly generated transaction or block at some moment. A general chain-type blockchain is a special case to a DAG, wherein only one block is generated in the entire system in a given time period. Differently, a DAG allows different nodes to generate transactions at their own paces, every block could choose one or more blocks as its parent-block. A DAG is obviously superior to the traditional chain-type blockchain, particularly in terms of scalability and transaction throughput. With the DAG-based data structure, every node can directly process new transactions without waiting for data consistency with other nodes, thereby preventing waste of time caused by network delay and data synchronization. Therefore, nodes participating in DAG accounting are easy to scale up. Additionally, a DAG can be added with an arbitrary amount of new data in parallel at its tail, making it innately have strong transaction throughput. This point beats chain-type blockchains. A chain-type blockchain can only increase data in the amount equal to one block, so the amount of transaction it could process is very difficult to change.

A TXID, or a Transaction ID, also known as a transaction Hash or a transaction number, is a long string of characters obtained by performing Hash computation to blockchain transaction information. A TXID is a character field necessary for labelling transfers in blockchain asset transactions. It is generally composed of tens of digits and letters. For example, for a transfer of 10 ETH from Address A to Address B, Address A can be used for the private key signature, so as to obtain SIGN of one signature, and then the signature is merged with the transaction. Then Hash value Computation is performed to generate the TXID. The TXID is broadcasted throughout the network, and if the transaction is successful, the transaction number/TXID can be retrieved from the blockchain network.

SHA256, name of SHA2 comes from the abbreviation of Secure Hash Algorithm 2, and is a standard for code hash function algorithms. SHA256 is an algorithm standard belonging to SHA2. The SHA256 algorithm accepts data input of any length. It outputs a string of random hash data as long as 32 bytes. The main principle of the SHA256 algorithm is that: for a message of an arbitrary length, it generates a 256-bit Hash value, called as a message abstract.

The abstract is equivalent to an array having a length of 32 bytes, and is usually represented by a hexadecimal character string having a length of 64. Therein, 1 byte=8 bits, and thus a hexadecimal character has a length of 4 bits. The compression function of SHA256 mainly operates on 512-bit message blocks and 256-bit intermediate hash values. Essentially, it is a 256-bit encryption algorithm that encrypts an intermediate Hash value using a message block as the secret key.

A graph-type blockchain mainly refers to a blockchain based on a DAG. In a DAG, data are connected and stored graphically.

Concurrency means an ability to process and schedule plural programs at the same time.

In information theory, the entropy is the average level of information volume contained in every message, and is also known as the information entropy, information source entropy, or the average self-information amount. Herein, the message represents an event, a sample, or a feature coming from distribution or a data stream. In the world of information, the higher the entropy is, the more information it transmits. When the entropy is lower, it means that information transmitted is less.

Entropy coding is about using different lengths of codes to represent different characters according to probabilities of these characters appearing in data. By decoding an entropy code, the original data can be completely recovered. A character more probable to appear is represented by a shorter code, and a character less probable to appear may be represented by a longer code.

Node: a node is a service (instance), and can implement functions of data storing, indexing, and searching. Every node in a blockchain network is equivalent to a computer or server terminal storing data of all blocks. Generation of new data blocks, as well as verification and statistic of affairs, plus broadcast them to the entire network for synchronization are all done by the nodes.

Cluster: a cluster is composed of one or plural nodes. Nodes in a cluster may store data, and provide cross-node indexing and searching functions.

Transaction: a block body is formed by transactions, namely, packed transactions. Transactions are actual data stored in a blockchain, and a block records and confirms when and in what order some transactions became a part of the blockchain.

Transaction Hash: a transaction Hash is the Hash value of every transaction in a block body, and is for constructing a Merkle tree. In a Merkle tree, every transaction Hash corresponds to a leaf node. Two adjacent Hash values are merged into a character string, and Hash is performed again, until the topmost node is obtained, which is a Merkle root Hash. In a blockchain, a complete transaction is composed of input, output, and script information, etc. By performing the SHA256 Hash computation on complete transaction contents for two times, the Hash value of the transaction, or the transaction Hash, can be obtained. Since input of a transaction needs to cite the output of some previous transaction, the Hash value of the cited transaction is added into the present transaction input to locate the transaction. The Hash value of some previous transaction appearing in the present transaction input is the first hash pointer of the transaction. Therein, the transaction Hash is used to construct a Merkle tree, and the first hash pointer of the transaction is to locate some previous transaction cited in the input of the present transition.

Bitnodes refers to real-time node information of the blockchain network. Bitnodes is an open-source project supported by the bitcoin foundation. Bitnodes mainly serves to collect and maintain node information of the network, and determine health of the blockchain network according to variations in the node information. Bitnodes maintains the number of nodes throughout the network, and shows distribution of global nodes in its website.

A topological structure refers to physical or logical relationship between computing units in a distributed system. A topological structure among nodes is always the important basis for determining system classification.

A Hash pointer is a data structure, and points to data storage location and Hash value of location data. A Hash pointer is a pointer that not only can point to a location of data storage, but also indicate the Hash value of the data at some given timestamp.

The Gossip protocol is a communication protocol, providing a way to disseminate messages. The concept of the Gossip protocol is that: one node wants to share some information to some nodes in the network, so the Gossip protocol randomly picks some nodes on a periodical basis for the node to disseminate information to these nodes. The nodes receiving the information then do the same thing, that is, passing the information to other randomly picked nodes. Generally speaking, the information thus can be periodically disseminated to N target nodes, not one. The main purpose of the Gossip protocol is information dissemination and spread, or to say, to disseminate some happened events to the whole world. The Gossip protocol is also used in occasions of database reproduction, information spreading, cluster membership identification, failure detection, and more. The Gossip protocol is scalable because it needs only O(log N) cycles to disseminate a message to all nodes. The node disseminating messages to a fixed number of nodes does not have to wait for confirmation, and even if some messages are lost during dissemination, no remedial measures are required from it.

The standard-conforming coding format may be entropy coding.

The present invention provides a network transmission optimization device orientated to a graph-type blockchain. The device comprises a transaction processing module, a node managing module, and a route managing module. According to embodiments of the present invention, the device may further comprise other components, such as a central processor, a communication unit, and an I/O unit. The network transmission optimization device of the present invention, preferably, may be, for example, a computer, a server, or another device or system using the network transmission optimization device. For simplicity, only one transaction processing module, one node managing module, and one route managing module are shown, but they may each include at least one sub-unit that each executes at least one of the steps corresponding to the relevant module. As examples, a general-purpose processor, a digital signal processor (DSP), an application specific integrated circuit (ASIC), a field programmable gate array (FPGA) or another programmable logic device, a discrete gate or transistor logic, a discrete hardware component and/or any combination for executing the disclosed functions may be used to realize or implement the various exemplary logic blocks, modules, and circuits as described herein. The general-purpose processor may be a micro-processor. Alternatively, the processor may be any ordinary processor, controller, micro-controller or state machine. The processor may alternatively be realized as a combination of computing equipment, such as a combination of DSP and a micro-processor, a combination of plural micro-processors, a combination of one or plural micro-processors and a DSP kernel, or any other similar structure. As examples, the disclosed embodiment may be described in the context of a machine-executable instruction. The machine-executable instruction may be incorporated in a program module operating in a device on the actual or virtual target processor. Generally speaking, the program module may include a routine, a program, a library, an object, a class, a component, a data structure, etc., and is for executing particular tasks or realizing particular abstract data structures. In individual embodiments, functions of the program module may be merged or divided among the described program modules. The machine-executable instruction used in the program module may be executed locally or in distributed equipment. In the distributed equipment, the program module may be located both locally and in a remote storage medium.

The present invention provides a network transmission optimization method orientated to a graph-type blockchain, which designs a transaction-compressing scheme and a secondary clustering method specially to reduce bandwidth consumption and transaction redundancy in a graph-type blockchain network, thereby improving use efficiency of network bandwidth resources. While the steps/operations in the network transmission optimization method of the present invention explained above have been described in a specific order, it is to be appreciated that the steps/operations are not required to be performed in this order or successively or to their complete extents to provide the expected results. In some situations, multi-task or parallel processing is beneficial. Similarly, while the discussion made above details some specific implementations, this shall not be interpreted as limitations to the scope of the present invention or any of the appended claims, and is merely description focused on specific embodiments of the present invention. In the disclosure, features described separately in the contexts of different embodiments may be integrated in a single embodiment. Also, features described in the context of one embodiment may be separately implemented in plural embodiments or in any suitable sub-combination.

A graph-type blockchain system features high throughput and good concurrency. However, its excessively huge transaction data cause serious bandwidth consumption during broadcast. In this regard, the present invention provides a transaction compression scheme for graph-type blockchain systems, which includes compressing and encoding existing local transactions, and separately compressing and encoding transactions in each category according to serial number category; when a new transaction is generated, the reference field of the new transaction is optimized by replacing a first hash pointer with a second hash pointer, i.e., replacing a full hash representation with a serial number plus compressed encoding, so as to efficiently utilize network bandwidth during transaction transmission.

FIG. 1 depicts the new scheme for compressed representation of transactions provided by the present invention, with the left and right boxes representing the transaction height and the transaction index, respectively. As shown, the original 32-byte first hash pointer is compressed into the 5-byte second hash pointer. The second hash pointer is composed of a transaction height and a transaction index. Herein, 5 bytes equal 40 bits. The first 20 bits represent the transaction height, and the last 20 bits represent the transaction index. According to the transaction height, all transactions are categorized, the way the transactions are composed in each category is analyzed separately, entropy is calculated, and the coding representation is narrowed down, so as to derive the transaction index.

In information theory, the entropy may be used to measure average level of information through the equation below:

$$H(x) = -\sum_{i=1}^{n} p(x_i) \times \log(2, p(x_i))$$

where i represents all possible samples in the probability space, $x_i$ represents the probability that the sample appears. When the base for the logarithm is 2, the computing result of the expression above is in the unit of bit. Therein, $p(x_i)$ represents the probability of occurrence of each character. The logarithm is to determine how many bits it requires to represent a character, performing a process of calculating the weighted sum of the probabilities for them, which may be regarded as figuring out the mathematical expectation, and the final result is the minimal number of bits required for representing every character in average.

For chained networks, each block has only one parent block and only one block is transmitted at a time. In a DAG blockchain, however, each transaction needs to reference a previous transaction. When a transaction is transmitted in the network, it needs to contain information about the transaction referenced by this transaction in addition to the basic transaction information of this transaction itself. With limited network resources, the transmission of this portion of data becomes one of the main causes of bandwidth consumption. When a large number of transactions are concurrent, it is not very practical to compress and encode all the transactions in the network, which cannot guarantee a good compression rate, and also makes it difficult to avoid the hash collision problem. The present invention adds a reliable serial number to each transaction, and the serial number indicates the sequence number of the transaction generated by the node, i.e., for a network of N nodes, there are at most N transactions with the same serial number. This serial number is generated in a trusted environment and cannot be tampered with or forged. For example, the TEE, or Trusted Execution Environment, is an area on the CPU that serves to provide a more secure space for the execution of data and code, and to guarantee their confidentiality and integrity. The trusted environment provided by the TEE ensures that the code running in the machine has not been tampered with and can operate as specified by the blockchain protocol, thus providing security for the entire blockchain network.

In IOTA of a graph-type blockchain, one transaction is composed of 2673 ternary coding characters, on which SHA256 Hash Computation is performed so as to produce a 32-byte transaction hash. If the transaction hash transmission is directly referenced, it will waste bandwidth resources and become a major factor limiting the throughput. In this regard, the present invention proposes the following transaction compression transmission process: first, the node that generates the transaction compresses and encodes the existing local transactions to obtain a second hash pointer. Specifically, the transaction-generating node classifies all the existing local transactions according to their serial numbers, statistically analyzes the transactions in different categories, applies the corresponding encoding scheme to reduce the transaction encoding representation, obtains the second hash pointer, and saves the optimized encoding in the local area. After that, the node that generates the new transaction verifies the new transaction by referring to the previous transaction and optimizes the reference field of the new transaction by replacing the first hash pointer with the second hash pointer, i.e., replacing the full hash representation with the serial number plus compressed encoding, so as to reduce the amount of data during transaction transmission and efficiently utilize the network bandwidth. Finally, the node broadcasts the new transaction to the whole network, and other nodes receiving the transaction perform transaction matching in the local memory pool based on the transaction height (i.e., serial number) and transaction index (i.e., transaction compression encoding) in the reference field of the transaction, and add the new transaction to its own book structure upon success.

Figure 2:
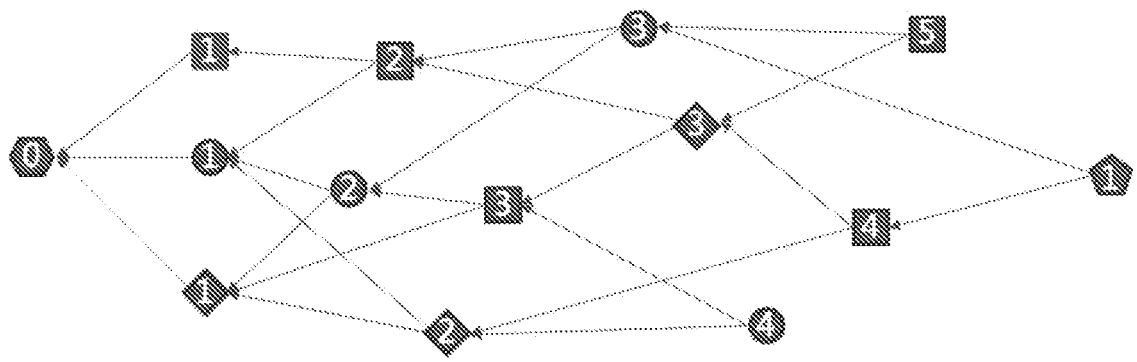
FIG. 2 is a schematic diagram of the DAG blockchain book structure mentioned in the present invention.

The DAG blockchain book structure mentioned in the present invention is given in FIG. 2. For the sake of illustration, we use different shapes to represent the transactions generated by different nodes, where a square represents node 1, a circle represents node 2, a diamond represents node 3, and a pentagon represents node 4. When node 4 is connected to the network, it first obtains the currently available transaction book structure and locally compresses and stores the transactions with the same serial number. After that, node 4 generates a new transaction, and since this is the first transaction the node 4 generates, the serial number is represented as 1. This transaction will select the previous transaction for verification, as shown in the figure, it selects the transaction with serial number 3 and the transaction with serial number 4. Thus, in the reference field of the new transaction, the full hash of these two transactions is replaced by 3_X and 4_Y, wherein X and Y denote the compression encoding representation of that transaction. Finally, the transaction is broadcast throughout the network, and the node that receives it verifies and forwards it. For example, if node 3 receives this transaction generated by node 4, node 3 will match the transaction with compression code X in the list of transactions with serial number 3 according to the reference field 3_X, and match the transaction with compression code Y in the list of transactions with serial number 4 according to the reference field 4_Y. After successful matching, node 3 will add the new transaction to its own book.

This compression encoding scheme can reduce the amount of data transmitted for transactions to some extent, and in situations that the network resource limit is not exceeded, the more parallel transactions there are, the more effective the encoding transmission scheme is. Because in chained blockchain networks, the block cannot be too large, otherwise the security of the blockchain system will be jeopardized, which in turn leads to a low number of transactions in the network. The DAG method breaks this limitation and allows transactions to be executed in parallel and nodes do not need to wait for consensus before receiving new transactions, avoiding the problems of time-consuming problems caused by book synchronization and network delays.

In a chain-type network, a new block will only refer to the previous block as its parent block, and all nodes have received the parent block. In a DAG blockchain, transactions can randomly select multiple parent transactions to be referenced, and the asynchronous communication nature of DAG may lead to inconsistency in the bookstructure of nodes at a certain moment, i.e., nodes may not have received the referenced transaction when they receive the new transaction, i.e., they cannot match successfully. However, due to the eventual consistency, the nodes save the new transactions locally and wait for a new round of matching after receiving the referenced transactions.

Nodes in the public chain network can join the network freely, and the number of transactions with the same serial number will increase. The number of transactions increases while the transaction information is compressed, which largely increases the collision probability. This scheme sets a threshold value for the transactions with collisions, and when the number of collision transactions exceeds this threshold, the complete transaction hash is re-requested. In addition, this scheme can effectively solve the double-spending problem without sorting all transactions or finding common ancestors to identify them. When an attacker adds two double-spend transactions at two different locations of the network, this scheme treats the earlier one as a valid transaction, i.e., the transaction with the lower serial number is considered valid.

Figure 3:
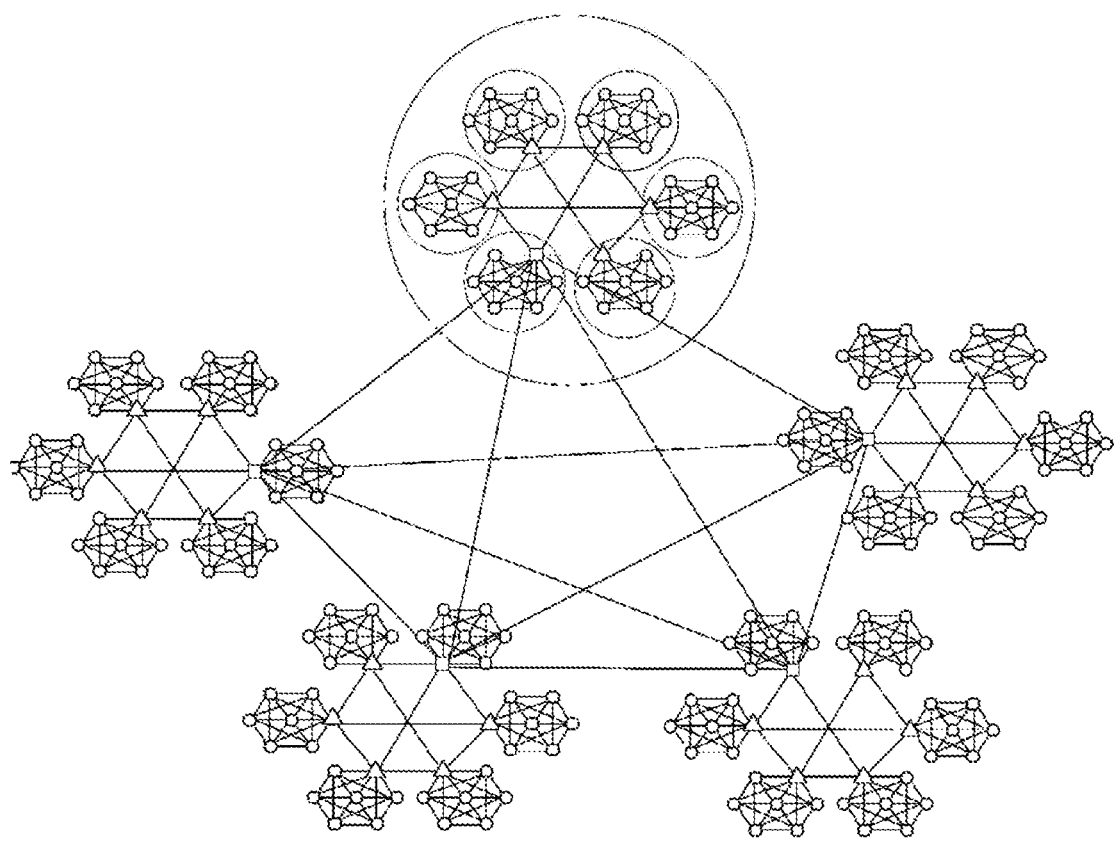
FIG. 3 is a schematic diagram of a network topological structure provided by the present invention.

The compressed transaction has to be broadcasted throughout the network. For reducing transmission delay, all nodes in the network are connected to form a particular network topological structure. The network topology is as shown in FIG. 3, where the smallest circle represents a normal node, the triangle represents a secondary routing node, the quadrilateral represents a primary routing node, the medium-sized circle represents a secondary cluster, and the largest circle represents a primary cluster. It is known that broadcast delay is the major reason of network transmission delay, and the topological structure is the determinant of broadcast delay. The network topology has two compositional factors. One is the number of neighboring nodes, and the other is the distance between every two nodes. If a node has more neighboring nodes, it can disseminate information to more nodes through broadcast, thereby reducing broadcast time. Furthermore, the shorter the distance between two nodes is, the less the network delay is, which also leads to reduced broadcast time.

Focused on the two factors improving broadcast efficiency, the present invention further provides a topological structure based on the K-Means clustering method, or the secondary clustering method. The method at least comprises dividing nodes in the entire network into several clusters according to the number of neighboring nodes and node distances. This parallelizes inter-cluster broadcast and intra-cluster broadcast, and allows different clusters to perform broadcast at the same time, thereby significantly enhancing broadcast efficiency and saving broadcast time. The method further comprises performing secondary clustering on the primary clusters, so as to generate plural secondary clusters. The number of the secondary clusters is greater than that of the primary clusters. Broadcast is also performed among nodes in a secondary cluster and among different secondary clusters in parallel, thereby further reducing broadcast time and further enhancing broadcast efficiency.

What is important to the secondary clustering method based on K-Means clustering is the average number of nodes $n_1$, $n_2$ of the twice clustering. According to information from bitnodes, as of December 2019, there were about 10074 online nodes. On this basis, assuming that $n_1 = n_2$, we can get $$n_1 = n_2 = \sqrt[3]{10074} \approx 21.6.$$

The computation result can be adjusted according to actual situations. If there are only 20 nodes in the cluster, broadcast time can be significantly reduced. However, there are more factors affecting the average number of nodes $n^1$, $n_2$ to be considered. For example, a fully distributed structured topology may be adopted by the primary cluster in order to further improve efficiency. In this case, the value of $n_1$ is selected to be small, making the value of $n_2$ great, so the broadcast speed of the primary cluster increases, yet the broadcast speed of the secondary cluster decreases. Therefore, to maximize the broadcast efficiency, simulation has to be introduced to determine the values of $n_1$, $n_2$.

In addition to the average number of nodes, another crucial factor for the secondary clustering method is selection of the routing node. Every secondary cluster chooses one secondary routing node, which serves to forward broadcast information from other secondary clusters to its own secondary cluster. This also applies in an opposite way as secondary routing node forwards broadcast information in the secondary cluster to other secondary clusters. Every primary cluster chooses the routing node of one secondary cluster as the primary routing node. This node acts as both the routing node for its own primary cluster, and the routing node for that secondary cluster.

In the topological structure formed by the secondary clustering, broadcast is done in parallel. For example, when one ordinary node in the secondary cluster generates and broadcasts a transaction, the transaction is only broadcasted in the secondary cluster, so as to prevent the huge network overheads that might otherwise be caused by the Gossip protocol. When the secondary routing node receives the broadcast, it forwards the information to other secondary routing nodes, which then forward the information to other nodes in their respective secondary clusters. Parallel broadcast can thus be done rapidly. After the primary routing node receives the broadcast, it forwards the information to other primary routing nodes, which then forward the information to other secondary routing nodes in their respective primary clusters and further forward to ordinary nodes. Preferably, for preventing crush of the routing node from interrupting broadcast, a backup node may be added. The number of such backup node depends on the failure rate of the routing node. The higher the failure rate is, the more backup nodes shall be needed.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A network transmission optimization device for a graph-type blockchain, characterized in at least comprising a transaction processing module, a node managing module, and a route managing module, wherein the transaction processing module performs compression on a transaction, and transaction data obtained through the compression are transmitted among different clusters through a routing node selected by the route managing module from at least one cluster, wherein the at least one cluster is obtained through dividing plural nodes by the node managing module, characterized in that the network transmission optimization device further comprises broadcast modules provided in each said node, the broadcast modules use a Gossip protocol to implement intra-cluster and inter-cluster information broadcast, and wherein the transaction processing module performs compression on the transaction at least through compressing a first hash pointer of the transaction into a second hash pointer.

2. The network transmission optimization device of claim 1, wherein the transaction processing module further encodes the transaction based on a standard-conforming encoding format, so as to generate a compressed representation of the transaction.

3. The network transmission optimization device of claim 2, wherein the second hash pointer comprises a transaction height and a transaction index that take equal occupancy spaces in the second hash pointer.

4. The network transmission optimization device of claim 3, wherein the transaction height is a serial number of the transaction in a DAG graph.

5. The network transmission optimization device of claim 4, wherein the transaction height takes a space of 20 bits, and the transaction index takes a space of 20 bits, so the second hash pointer takes a space of 40 bits.

6. The network transmission optimization device of claim 5, wherein encoding the transaction may be performing entropy coding on at least some fields in the transaction.

7. A network transmission optimization method for a graph-type blockchain, at least comprising:
performing compression on a transaction, and transmitting transaction data obtained through the compression among different clusters through a routing node selected from at least one cluster, wherein the at least one cluster is obtained through dividing plural nodes, wherein a Gossip protocol is used to implement intra-cluster and inter-cluster information broadcast, and wherein the step of performing compression on a transaction at least includes: compressing a first hash pointer of the transaction into a second hash pointer.

8. The network transmission optimization method of claim 7, wherein the step of performing compression on a transaction further includes: encoding the transaction based on a standard-conforming encoding format, so as to generate a compressed representation of the transaction.

9. The network transmission optimization method of claim 8, wherein the second hash pointer comprises: a transaction height, representing the height of a shortest route of a cited transaction in a DAG graph starting along a genesis block; and a transaction index, representing the location index of the cited transaction at the same height, sorted according to transaction timestamps.

10. The network transmission optimization method of claim 9, wherein the transaction height takes a space of 20 bits, and the transaction index takes a space of 20 bits, so the second hash pointer takes a space of 40 bits.

11. The network transmission optimization method of claim 9, wherein the operation of encoding the transaction may be performing entropy coding on at least some fields in the transaction.

12. The network transmission optimization method of claim 11, wherein the step of performing secondary clustering on all nodes in the network at least comprises: performing primary clustering on all nodes in the network, so as to divide them and obtain at least one primary cluster; and performing secondary clustering on the nodes in each primary cluster, so as to divide them and obtain at least one secondary cluster under the primary cluster.

13. The network transmission optimization method of claim 12, wherein the step of clustering and dividing all nodes in the network is performed based on the number of neighboring nodes and node distances.

14. The network transmission optimization method of claim 13, wherein each secondary cluster selects one node therein as a secondary routing node, which servers to forward the broadcast information transmitted by other secondary clusters to its own secondary cluster.

15. The network transmission optimization method of claim 14, wherein each primary cluster selects a routing node of one secondary cluster therein as a primary routing node.

16. The network transmission optimization method of claim 15, wherein the secondary routing node receiving the broadcast information forwards the information to other secondary routing nodes, which in turn forward the information to the nodes in its own secondary cluster, and/or the primary routing node receiving the broadcast information forwards the information to other primary routing nodes, which in turn forward the information to other secondary routing nodes in its own primary cluster.

* * * * *